United States Patent
Jia et al.

(10) Patent No.: US 11,269,844 B2
(45) Date of Patent: Mar. 8, 2022

(54) AUTOMATED DATA LABELING

(71) Applicant: INTERNATIONAL BUSINESS MACHINES CORPORATION, Armonk, NY (US)

(72) Inventors: Hong Wei Jia, Beijing (CN); Guang Ming Zhang, Beijing (CN); Wu Yan, Beijing (CN); Mo Chi Liu, Beijing (CN); Yun BJ Wang, Beijing (CN); Chu Yun Tong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 16/740,647

(22) Filed: Jan. 13, 2020

(65) Prior Publication Data

US 2021/0216521 A1 Jul. 15, 2021

(51) Int. Cl.
*G06F 16/22* (2019.01)
*G06F 40/295* (2020.01)
*G06F 16/23* (2019.01)

(52) U.S. Cl.
CPC .......... *G06F 16/2291* (2019.01); *G06F 16/23* (2019.01); *G06F 40/295* (2020.01)

(58) Field of Classification Search
CPC .............................. G06F 16/23; G06F 16/2291
See application file for complete search history.

(56) References Cited

U.S. PATENT DOCUMENTS

| | | |
|---|---|---|
| 6,697,998 B1 | 2/2004 | Damerau et al. |
| 8,140,531 B2 | 3/2012 | Graf et al. |
| 8,819,030 B1 | 8/2014 | Freed et al. |
| 8,874,435 B2 | 10/2014 | Halberstadt et al. |
| 9,836,520 B2 | 12/2017 | Jose et al. |
| 2013/0339311 A1* | 12/2013 | Ferrari .................... G06Q 30/06 707/687 |
| 2014/0180961 A1* | 6/2014 | Hankins ............. G06Q 10/0637 705/348 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Eliyah S. Harper
(74) *Attorney, Agent, or Firm* — William Hartwell; Andrew D. Wright; Roberts Calderon Safran & Cole, P.C.

(57) ABSTRACT

Systems and methods for computer-automated labeling of data are disclosed. In embodiments, a method includes: identifying technical data assets in lineage data and corresponding business items in User Interface (UI) data of a user, wherein the lineage data includes a data source for the UI data; mapping the technical data assets to the corresponding business items; determining relevant labels to assign to the technical data assets from a label repository based on a similarity analysis of names of the corresponding business items and labels in the label repository; determining that one or more of the relevant labels meet a confidence threshold based on the similarity analysis; and automatically assigning the one or more of the relevant labels to associated ones of the technical data assets based on the determining that the one or more of the relevant labels meet the confidence threshold.

20 Claims, 9 Drawing Sheets

(56) References Cited

U.S. PATENT DOCUMENTS

| | | | |
|---|---|---|---|
| 2014/0279526 A1* | 9/2014 | Jackson | G06Q 20/405 |
| | | | 705/44 |
| 2014/0279540 A1* | 9/2014 | Jackson | G06Q 20/02 |
| | | | 705/44 |
| 2016/0092480 A1* | 3/2016 | Madison | G06Q 10/06398 |
| | | | 705/7.42 |
| 2016/0217201 A1* | 7/2016 | Hummel | G06F 16/35 |
| 2019/0065990 A1* | 2/2019 | Sharma | G06N 5/04 |
| 2019/0244113 A1* | 8/2019 | Ramos | G06N 3/08 |
| 2021/0029003 A1* | 1/2021 | Morman | H04L 41/046 |

OTHER PUBLICATIONS

Anonymous, "Data classification", https://www.ibm.com/support/knowledgecenter/en/SSZJPZ_11.7.0/com, IBM, accessed Nov. 11, 2019, 3 pages.

* cited by examiner

AUTOMATED DATA LABELING

BACKGROUND

Aspects of the present invention relate generally to data labeling and, more particularly, to automated data labeling using data lineage exploration.

Data asset labeling is a process of attaching business terms to technical data assets, such as tables, views, columns, etc. In general, labeling takes a set of unlabeled data and augments each piece of that unlabeled data with meaningful tags that are informative. Such labeling helps business users easily find the data they want.

In general, a user interface (UI) is a space where interactions between humans and machines occur. Various UI tools have been developed to provide users with targeted information or UI data, such as dashboards. In general, a dashboard is a type of UI report which provides significant information about a subject on a single page. Dashboards often provide at-a-glance views of key performance indicators (KPIs) relevant to a particular objective or business process. Dashboards may aggregate data from local and/or remote data sources, and display targeted data in a browser-based location.

SUMMARY

In a first aspect of the invention, there is a computer-implemented method including: identifying, by a computing device, technical data assets in lineage data and corresponding business items in User Interface (UI) data of a user, wherein the lineage data comprises a data source for the UI data; mapping, by the computing device, the technical data assets to the corresponding business items; determining, by the computing device, relevant labels to assign to the technical data assets from a label repository based on a similarity analysis of names of the corresponding business items and labels in the label repository; determining, by the computing device, that one or more of the relevant labels meet a confidence threshold based on the similarity analysis; and automatically assigning, by the computing device, the one or more of the relevant labels to associated ones of the technical data assets based on the determining that the one or more of the relevant labels meet the confidence threshold.

In another aspect of the invention, there is a computer program product including a computer readable storage medium having program instructions embodied therewith. The program instructions are executable by a computing device to cause the computing device to: obtain lineage data from a plurality of remote lineage data sources based on participant data; identify technical data assets in the lineage data and corresponding business items in User Interface (UI) data of a user, wherein the lineage data comprises a data source for the UI data; map the technical data assets to the corresponding business items; determine relevant labels to assign to the technical data assets from a label repository based on a similarity analysis of names of the corresponding business items to labels in the label repository; determine whether each of the relevant labels meets a confidence threshold based on the similarity analysis; and automatically assign one or more of the relevant labels to associated ones of the technical data assets based on determining that the one or more of the relevant labels meet the confidence threshold.

In another aspect of the invention, there is system including a processor, a computer readable memory, one or more computer readable storage media, and program instructions collectively stored on the one or more computer readable storage media for execution by the processor via the computer readable memory. The program instructions are executable to: aggregate lineage data of a user, wherein the lineage data is source data for a dashboard User Interface (UI) report of the user; identify technical data assets in the lineage data and corresponding business items in the dashboard UI report generated based on the technical data assets; map the technical data assets to the corresponding business items; determine relevant labels to assign to the technical data assets from a label repository based on a similarity analysis of names of the corresponding business items to labels in the label repository; determine whether each of the relevant labels meets a confidence threshold based on the similarity analysis; automatically assign one or more of the relevant labels to associated ones of the technical data assets based on determining that the one or more of the relevant labels meet the confidence threshold; and generate a notification to the user including the one or more of the relevant labels based on determining that the one or more of the relevant labels do not meet the confidence threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
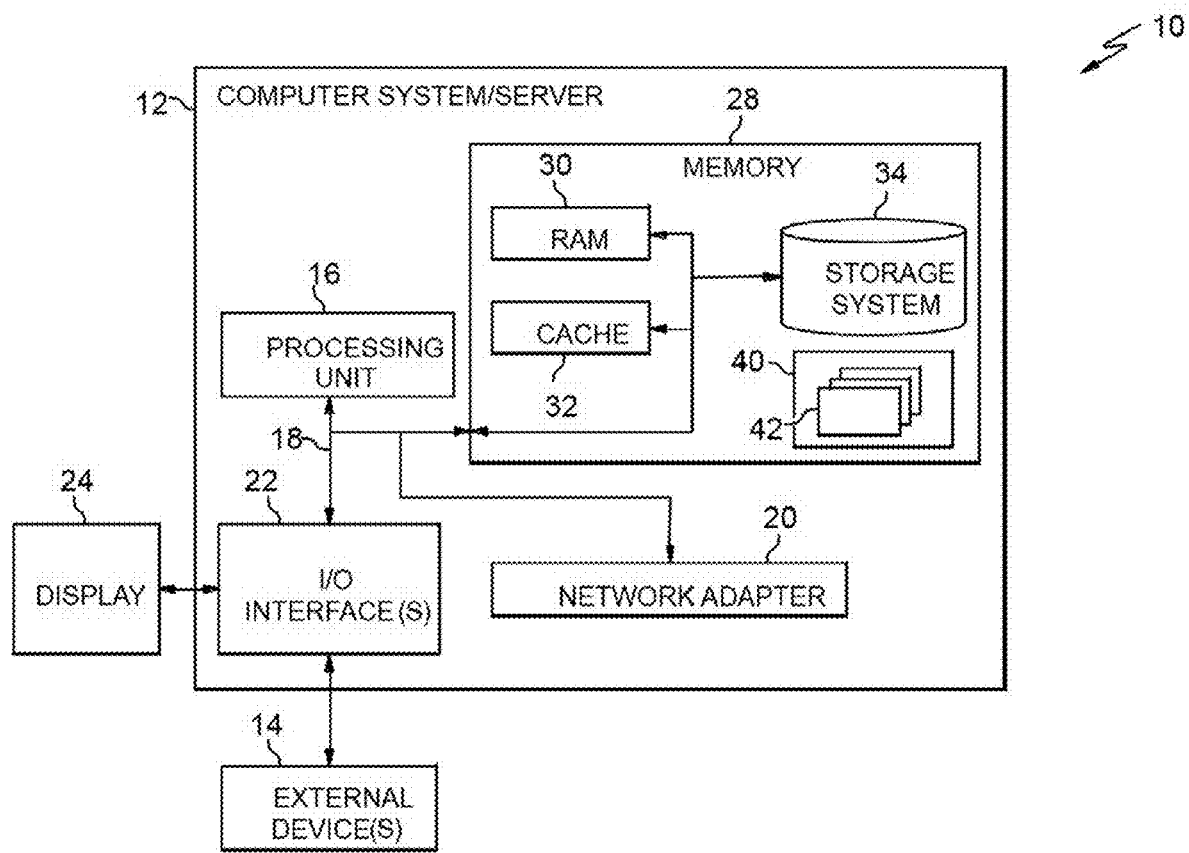
FIG. 1 depicts a cloud computing node according to an embodiment of the present invention.

Aspects of the present invention relate generally to data labeling and, more particularly, to automated data labeling using data lineage exploration. In embodiments, a system, computer program product and method are provided for automatic labeling of technical data assets through data lineage exploration. Implementations of the invention (1) leverage data lineage exploration of dashboards or other User Interface (UI) reports; (2) interact with knowledge graphs dynamically to infer relevant labels and label attributes for automatic labeling of technical data assets; and (3) run similarity/cluster analysis for automatic the automatic labeling.

Data asset labeling assists users in finding relevant data. If a name of a technical data asset is self-explanatory or a naming rule is easy to reason out, then labeling of technical data assets may be relatively simple. Presently, auto discover functionality can label these kind of data with algorithms including fuzzy match, similarity analysis, etc. See for example, the auto discovery functionality provided by Infosphere®, an Information Server of International Business Machines Corporation ("IBM"). In large enterprises, there may be many products purchased from different vendors. To protect source code of their products, the vendors may define their own complex naming rules for technical data assets. Auto discover tools may not work in such cases, and the labeling of such data assets provides a challenge to enterprises during data curation.

Advantageously, embodiments of the invention constitute improvements in the technical field of data management by providing systems and methods for automatic data asset labeling utilizing data lineage exploration techniques. In aspects, UI reports (e.g., dashboards) are generated through data processes including data organizing, and extract, transform, load (ETL) tools, etc. In implementations, a system of the invention conducts an analysis of lineage data utilized to generate the UI reports, enabling the system to understand which tables, views or columns constitute originating data for business items (e.g., charts, graphs, targeted information tables, etc.) in the UI reports. In embodiments, a system can understand the business meaning of related tables, views or columns, and these technical data assets are automatically labeled with relevant business terms. Even in situations where a naming rule for source data (e.g., tables, views or columns) is complex, embodiments of the invention provide an easily implemented automated labeling function removed from the naming rule.

Embodiments of the invention define and create labels or business terms, match UI reports with labels by report name or report items' names using a similarity analysis, and map the business terms to business items in the UI reports. Aspects of the invention utilize data lineage exploration of the UI reports. Embodiments of the invention explore data lineage using Structured Query Language (SQL) analysis by: capturing the SQL used by the UI reports; analyzing the SQL; and identifying the tables, views or columns in the lineage data corresponding to the business items in the UI reports. For example, with the SQL "Select T01.AA01 as Cost, T02.AA02 as Revenue . . . From T01, T02 where . . . ," systems of the invention can infer that the column AA01 corresponds to the business item "Cost" and AA02 corresponds to "Revenue".

Additionally, implementations of the invention build mapping between tables, views or columns and business items in the UI reports, and build mapping between the business items and labels (e.g., business terms). Systems of the invention automatically label the tables, views or columns with the business terms based on the mapping. In embodiments, inferences are made to assist in labeling based on a knowledge graph. One example of an inference approach is as follows. Considering A↔B, and B↔C, then A↔C.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
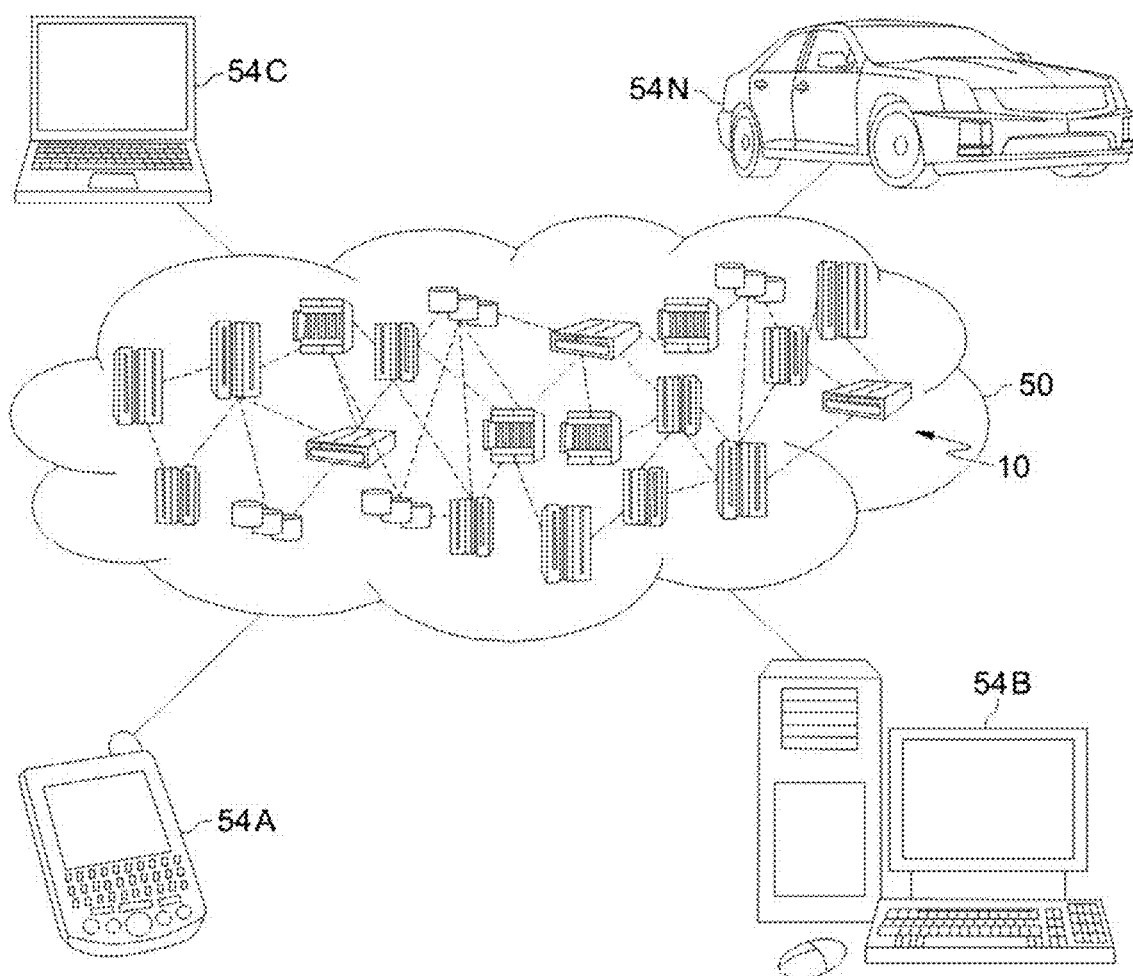
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
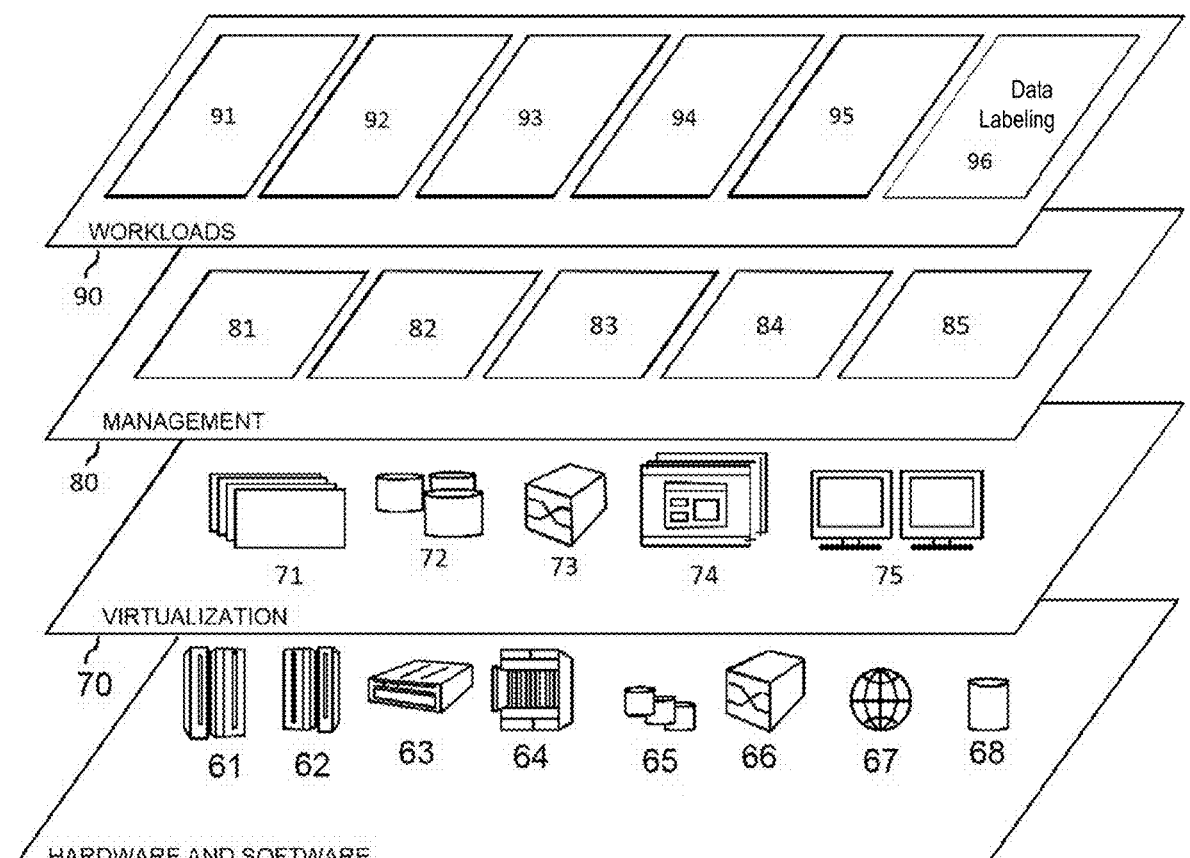
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data labeling 96.

Implementations of the invention may include a computer system/server 12 of FIG. 1 in which one or more of the program modules 42 are configured to perform (or cause the computer system/server 12 to perform) one or more functions of the data labeling 96 of FIG. 3. For example, the one or more of the program modules 42 may be configured to: analyze lineage data of UI reports to identify technical data assets (e.g., data tables, views and columns) and corresponding business items of the UI reports (e.g., attributes, charts, graphs, etc.); map the business items to the technical data assets; infer business items with attributes that correspond to or are relevant to the technical data assets based on a knowledge graph to determine a subset of the corresponding business items; determine relevant labels for the data assets based on a similarity/cluster analysis of names of the corresponding business items; determine if the relevant labels meet a threshold, and automatically label the technical data assets based on the similarity/cluster analysis.

Figure 4:
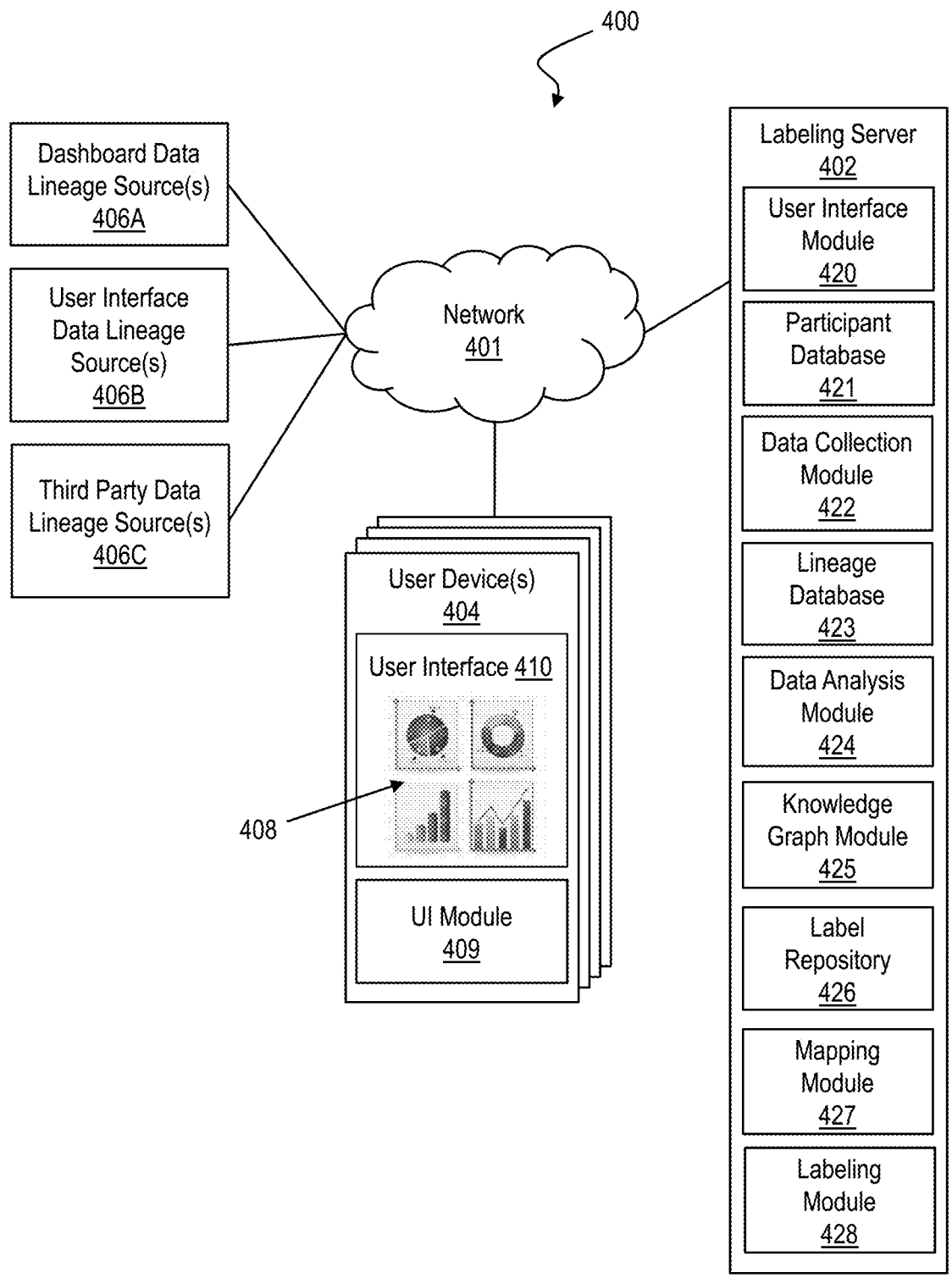
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 401 connecting a labeling server 402 with a plurality of user devices represented at 404 and one or more data lineage sources represented at 406A-406C. In the example of FIG. 4, the data lineage sources include dashboard data lineage sources 406A comprised of data utilized to generate one or more dashboards; user interface data lineage sources 406B comprised of data utilized to generate one or more UI pages; and third party data lineage sources 406C comprised of third party data utilized to generate one or more dashboards or UI pages. One example of a third party data source is a weather data center providing weather data for use in dashboard and/or UI page generation. In implementations, the respective data lineage sources 406A-406C include components of the computer system 12 of FIG. 1, and store technical data assets that may be utilized to generate one or more UI reports (e.g., dashboards 408) and/or UI pages for display by UIs 410 of the respective user devices 404.

The one or more user devices 404 may each include components of the computer system 12 of FIG. 1, and may be a desktop computer, laptop computer, tablet, smartphone, or other personal computing device. The labeling server 406 may also include components of the computer system 12 of FIG. 1, and may comprise a special purpose computing device configured to provide the user devices 404 with automatically labeled technical asset data.

The network 401 may be any suitable communication network or combination of networks, such as a local area network (LAN), a general wide area network (WAN), and/or a public network (e.g., the Internet). Devices of the environment 400 may interconnect via wired connections, wireless connections, or a combination of wired and wireless connections.

Still referring to FIG. 4, the labeling server 402 may include one or more program modules (e.g., program module 42 of FIG. 1) executed by the labeling server 402 and configured to perform one or more functions described herein. In embodiments, the labeling server 402 includes one or more of the following: a user interface module 420; a participant database 421; a data collection module 422; a lineage database 423; a data analysis module 424; a knowledge graph module 425; a label repository 426; a mapping module 427; and a labeling module 428.

In embodiments, the user interface module 420 is configured to enable users of the user devices 404 to provide the labeling server 402 with participant information to be stored in the participant database 421, such as registration information and designated lineage data sources associated with the user (e.g., utilized by dashboard-generating tools of the user devices 404). For examples, users may input registration data into a user interface provided by the user interface module 420.

In implementations, the data collection module 422 is configured to obtain lineage data from one or more designated data lineage sources 406A-406C associated with a user, wherein the lineage data serves as a source of data for UI data (e.g., UI reports such as dashboard 408 or UI pages generated by a UI module 409). In aspects, the data collection module 422 stores the aggregated lineage data in the lineage database 423.

In embodiments, the data analysis module 424 is configured to analyze lineage data in the lineage database 423 to identify technical data assets (e.g., data tables, views, columns) in the lineage data that correspond to business items of the UI data (e.g., charts in the dashboard 408).

In aspects, the knowledge graph module 425 is configured to generate knowledge graphs based on user behavior data (e.g., user behavior data from a dashboard tool of the UI module 409). Various knowledge graph generating tools and methods may be utilized by the knowledge graph module 425.

In implementations, the label repository 426 is configured to store predetermined labels to be utilized by the labeling server 402 in automatic labeling functions. Labels in the label repository can be obtained from another computing device, or input by a user of the labeling server 402. Labels may be, for example, business labels utilizing standard business terms such as "Cost" or "Revenue".

In embodiments, the mapping module 427 is configured to map the business items identified by the data analysis module 424 to the corresponding technical data assets and determine relevant labels from the label repository 426 based on a similarity analysis or cluster analysis of names of the business items. In aspects, the mapping module 427 is further configured to map relevant labels (e.g., business labels) to the technical data assets based on the mapping of the business items to the technical data assets. In implementations, the mapping module 427 can filter technical data assets to produce a subset of technical data asset to associate with the business items utilizing inferences determined from a knowledge graph generated by the knowledge graph module 425.

In implementations, the labeling module 428 is configured to automatically label technical data assets with relevant labels based on the mapping and similarity analysis/cluster analysis. In aspects, the labeling module 428 is configured to automatically label the technical data assets when a confidence value for a relevant label meets a predetermined confidence threshold, and is configured to provide the relevant label as a labeling recommendation to a user when the confidence value does not meet the predetermined confidence threshold.

In embodiments, the labeling server 402 includes additional or fewer components than those shown in FIG. 4. In implementations, separate components may be integrated into a single computing component or module. Additionally, or alternatively, a single component may be implemented as multiple computing components or modules. Additionally, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
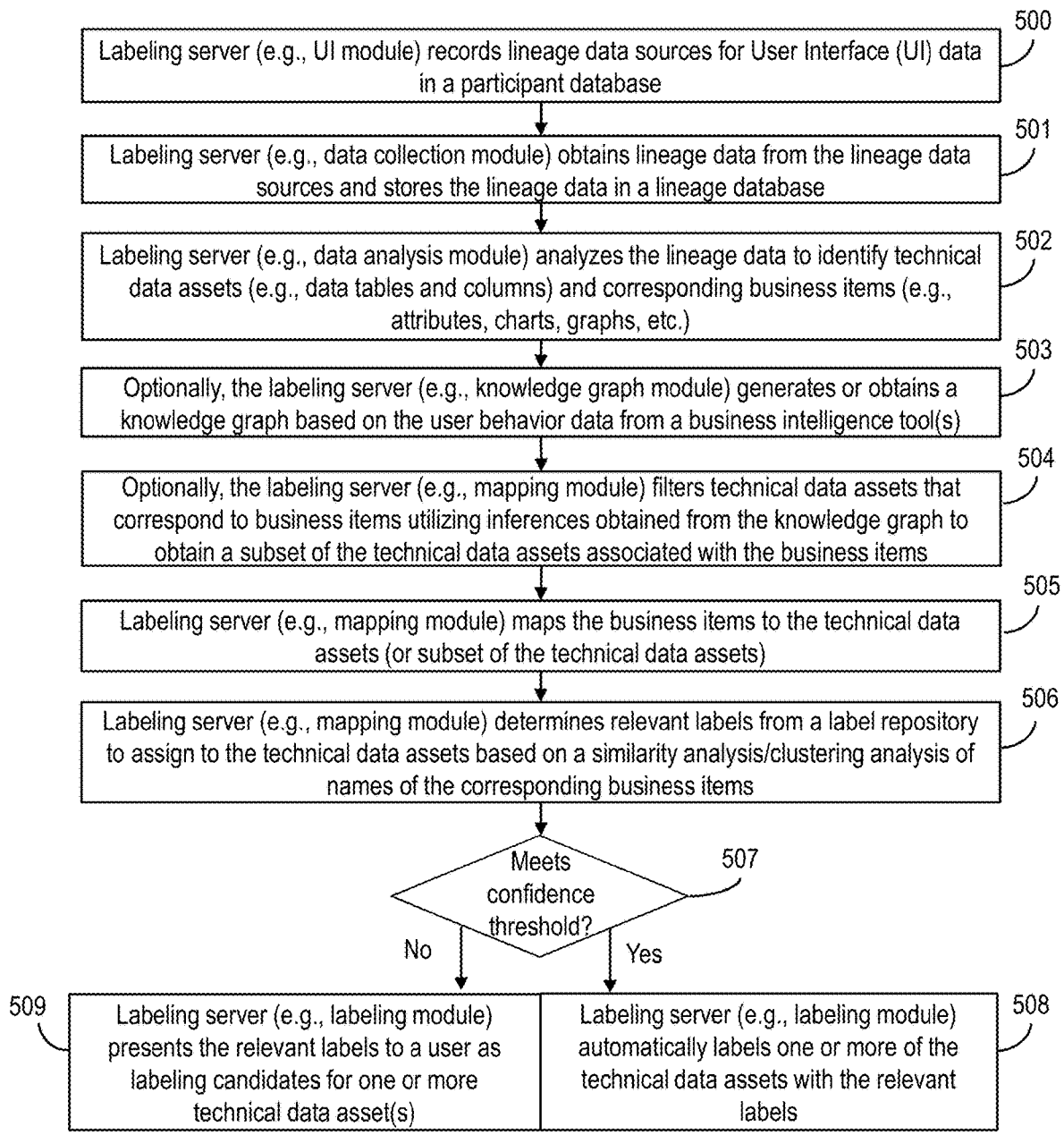
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the labeling server 402 records, for each user, lineage data sources for UI data of the respective users in the participant database 421. The term UI data as used herein refers to data that provides targeted information to the user via a UI interface (e.g., dashboard 408 or UI page) based on lineage data (source data). The targeted information (e.g., key performance indicators (KPIs)) may be selected by the users utilizing business intelligence (BI) tools, such as dashboard tools enabling a user to select the targeted information to be displayed by the dashboard 408. In embodiments, the UI data comprises at-a-glance views of KPIs relevant to a particular objective or business process of the user, in the form of graphs, charts, tables, attribute elements, or the like. Various BI software tools may be utilized by user devices 404 to retrieve, analyze, transform and report UI data to a user, and the present invention is not intended to be limited by any BI software tools or methods utilized by the user devices 404.

In implementations, a user provides the labeling server 402 with a list of lineage data sources (e.g., dashboard data lineage sources 406A, user interface data lineage sources 406B, third party data lineage sources 406C) utilized (e.g., by the UI module 409) to generate UI data (e.g., dashboard 408) for the user. In aspects, the user accesses a data entry window provided by the user interface module 420 of the labeling server 402 to provide the labeling server 402 with pertinent information regarding the lineage data sources (e.g., locations of the lineage data sources, names of the lineage data sources, permissions to access the lineage data sources, etc.). In embodiments, information regarding the lineage data sources enables the labeling server 402 to access UI data information such as Application Programming Interface (API) chain information and Extract, Transform, Load (ETL) workflow data associated with a dashboard (e.g., dashboard 408). In implementations, the labeling server 402 records registration information of users in the participant database 421 with the lineage data source information, such as names, contact information, or other pertinent registration information. In embodiments, the user interface module 420 of the labeling server 402 implements step 500.

At step 501, the labeling server 402 obtains lineage data from the lineage data sources recorded at step 500, and stores the lineage data in the lineage database 423. The lineage data may be obtained from one or more local or remote data sources, such as the dashboard data lineage sources 406A, the user interface data lineage sources 406B and the third party data lineage sources 406C based on information stored in the participant database 421. The labeling server 402 may obtain the lineage data on a periodic or continuous basis, and may update the lineage database 423 with new data accordingly. In embodiments, the data collection module 422 of the labeling server 402 implements step 501.

At step 502, the labeling server 402 analyzes the lineage data of a user to identify technical data assets and corresponding business items (e.g., attribute elements, charts, graphs, etc.) in the UI data of the user. The term technical data asset as used herein refers to one or more subsets of the lineage data (e.g., tables, columns, etc.) utilized by BI tools of the user to generate the UI data (e.g., dashboard 408). In one example, a user chooses certain KPI to be displayed on the dashboard 408, and a BI tool of the user generates the dashboard 408 including the KPI based on select data (e.g., in a certain column and row of a table) from a lineage data source (e.g., dashboard data lineage source 406A). In this example, the technical data asset comprises the table, and specifically, the column and row of the table. The term business item as used herein refers to one or more instances of targeted information presented to the user in the UI data.

For example, the business item may be a graph depicting KPIs in the dashboard 408. In one illustrative example, the labeling server 402 analyses the lineage data of a user to identify a source table that provides the data utilized by the UI module 409 to generate a graph in the dashboard 408, wherein the table comprises a technical data asset and the graph comprises a business item.

Various methods may be utilized by the labeling server 402 to explore data lineage of the business items in the implementation of step 502. In aspects, the labeling server 402 conducts an ETL process analysis, application programming interface (API) chain analysis, software source code analysis, and/or structured query language (SQL) analysis to identify technical data assets in lineage data associated with business items in UI data. Analysis tools and methods that may be utilized according to embodiments of the invention will be discussed in more detail below with respect to FIGS. 6-8. In embodiments, the data analysis module 424 of the labeling server 402 implements step 502.

At step 503, the labeling server 402 optionally generates or obtains a knowledge graph based on user behavior data from a BI tool (e.g., dashboard generating tool). The term knowledge graph as used herein refers to a graph that acquires and integrates information into an ontology and applies a reasoner to derive new knowledge. In embodiments, the knowledge graph module 425 of the labeling server 402 implements step 504.

At step 504, the labeling server 402 optionally filters technical data assets that correspond to the business items utilizing inferences obtained from the knowledge graph of step 503 to obtain a subset of technical data assets associated with the business items. In implementations, the labeling server 402 identifies attributes (e.g., features) of the business items and determines a subset of the technical data assets that include data associated with those attributes. For example, a table (technical data asset) of the lineage data may be associated with a graph (business item) of the dashboard 408 in accordance with step 502, but an analysis of the knowledge graph may indicate that only a certain column from the table includes data of interest to the user. In this example, the labeling server 402 can filter the technical data assets so that only a subset of a technical data asset (i.e., the column of the table) is associated with the business item of the dashboard 408, rather than the whole technical data asset. In embodiments, the mapping module 427 of the labeling server 402 implements step 504.

At step 505, the labeling server 402 maps the business items of the UI data to the associated technical data assets of the lineage data identified at step 502, or the subset of technical data assets identified at step 504. Various mapping techniques may be utilized by the labeling server 402 to map the business items to associated technical data assets and save the mapped data on the labeling server 402. In aspects of the invention. The filtering of step 504 may be conducted after the mapping of step 505, and the mapping data may be updated based on the filtering. In embodiments, the mapping module 427 of the labeling server 402 implements step 505.

At step 506, the labeling server 402 determines relevant labels (e.g., terms) for the technical data assets based on a similarity analysis or cluster analysis of names of the business items corresponding to the technical data assets (in the mapping data) and a plurality of labels in the label repository 426. In implementations, the labeling server 402 accesses mapped data from step 505 to determine which labels in the label repository 426 are most similar to names of business items of user UI data (e.g., names of graphs, charts, or portions thereof, etc. of the dashboard 408). In aspects, a cluster analysis is performed by the labeling server 402 in the implementation of step 506. In implementations, the labeling server 402 maps the relevant labels to the technical data assets and saves the mapping data on the labeling server 402. In embodiments, the mapping module 427 of the labeling server 402 implements steep 506.

At step 507, the labeling server 402 determines if the confidence value of a relevant label generated by the similarity analysis/cluster analysis utilized in step 506 meets a predetermined threshold value for automatic labeling. In implementations, if the confidence value for a particular label meets or exceeds the predetermined threshold value then the labeling server 402 considers the label to be an automatic match for the associated technical data asset. Conversely, if the confidence value for the label does not meet the predetermined threshold value, then the labeling server 402 considers the label to be either a potential match for the technical data asset, or not a match for the technical data asset. A plurality of predetermined threshold values and stored rules may be utilized by the labeling server 402 in the determination of whether a label is a match, potential match, or not a match, with respect to a technical data asset. In embodiments, the labeling module 428 implements step 507. Additionally, or alternatively, the mapping module 427 may implement step 507.

At step 508, the labeling server 402 automatically labels one or more of the technical data assets with the corresponding relevant labels determined at step 506 when the relevant labels meet the threshold value at step 507. In this way, labels determined to be relevant to the technical data assets based on names of business items found to be associated with the technical data assets may be automatically associated with the technical data assets. A variety of labeling or tagging tools may be utilized by the labeling server 402 in the implementation of step 508, and the invention is not intended to be limited to the particular method of labeling the technical data assets. In embodiments, the labeling module 428 of the labeling server 402 implements step 508.

At step 509, the labeling server 402 presents one or more of the relevant labels to the user as a labeling candidate for one or more corresponding technical data assets when the labeling server 402 determines at step 507 that the confidence value for the respective relevant labels does not meet the predetermined threshold value for automatic labeling. The relevant labels may be presented to the user in a notification (e.g., email, pop-up, etc.), list, or other format. The labeling server 402 may present the relevant labels to the user via a display of the labeling server 402, or may send a notification, list, etc., to a remote computing device of the user (e.g., user device 404).

Figure 6:
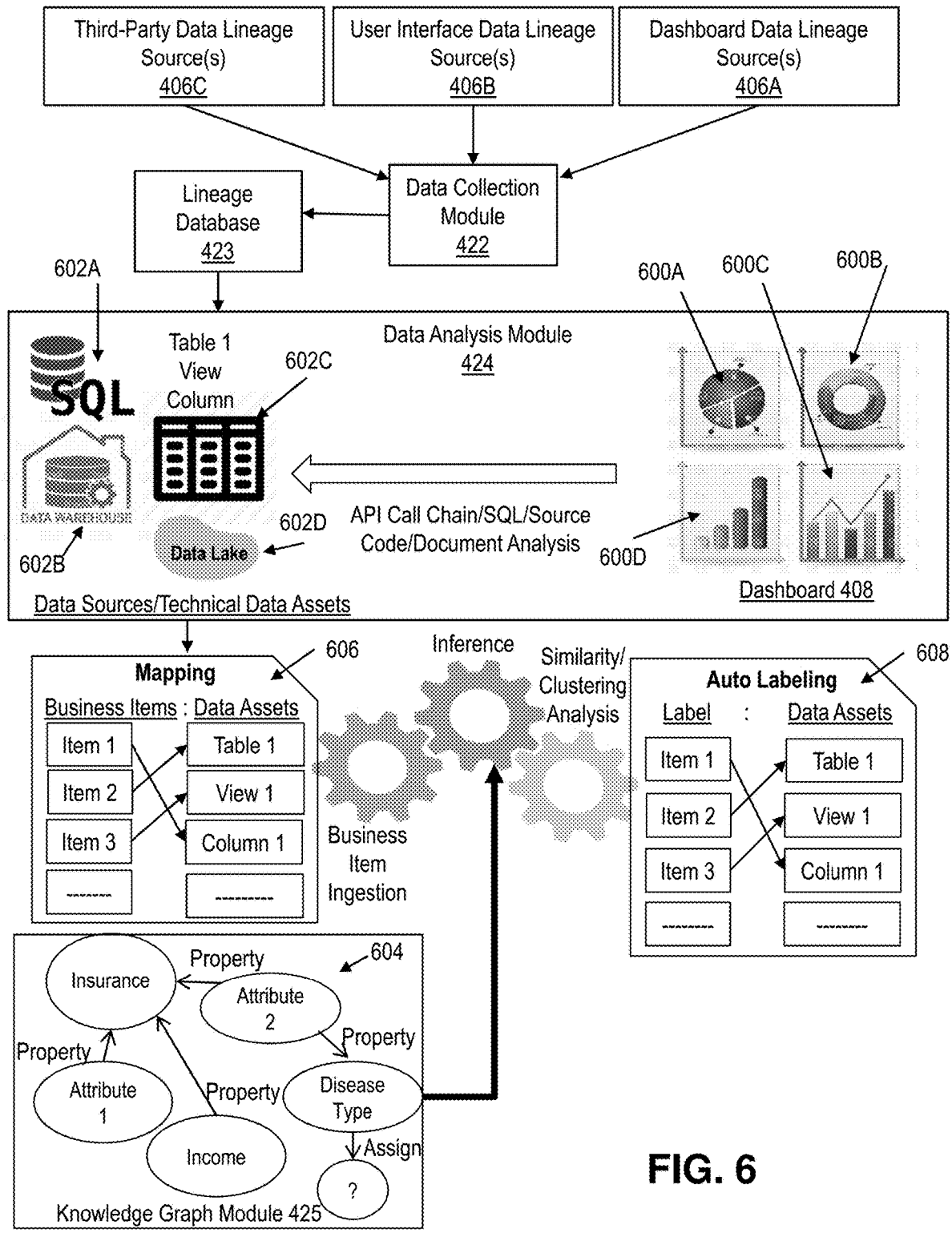
FIG. 6 depicts a flow diagram of an exemplary use scenario in accordance with aspects of the present invention.

FIG. 6 depicts a flow diagram of an exemplary use scenario in accordance with aspects of the present invention. Steps of the use scenario may be carried out in the environment of FIG. 4 and are described with reference to elements depicted in FIG. 4 and the method steps depicted in FIG. 5.

In the exemplary use scenario of FIG. 6, a user authorizes the labeling server 402 to access information associated with the dashboard 408 of the user in accordance with step 500 of FIG. 5. In this example, the dashboard 408 utilizes information from the dashboard data lineage source 406A, the user interface data lineage source 406B and the third party data lineage source 406C. The data collection module 422 of the labeling server 402 saves the lineage data from the data lineage sources 406A-406C in the lineage database 423, and the data is analyzed by the data analysis module 424 in accordance with step 502 of FIG. 5. In this example, the data analysis module 424 determines that the dashboard 408 includes business items 600A, 600B, 600C and 600D. The business items 600A-600D may each comprise a plurality of business items (sub-items). The data analysis module 424 analyses the business items 600A-600D to determine sources of data in the lineage database 423.

In the example of FIG. 6, the data analysis module 424 looks at API call chain information, SQL data associated with the dashboard 408, source code data associated with the dashboard 408, and/or analysis of documents associated with the dashboard 408. In particular, the data analysis module 424 performs an ETL workflow analysis for the dashboard data lineage source 406A and third party data lineage source 406C, and performs an API chain, document, source code, and SQL analysis for the user interface data lineage source 406B. In particular, the data analysis module 424 determines that UI data of the dashboard 408 originates from a plurality of data sources including an SQL database 602A, a data warehouse 602B, a data table 602C, and a data lake 602D. The data sources include technical data assets from which the business items 600A-600D are generated. In this example, the technical data assets include the table 1, as well as a view 1, and a column 1.

With continued reference to FIG. 6, and in accordance with step 505 of FIG. 5, the mapping module 427 maps the business items 600A-600D to the technical data assets in the originating data sources 602A-602D. In the example of FIG. 6, the knowledge graph module 425 generates a knowledge graph 604 from user data associated with the UI module 409 that generates the dashboard 408. In accordance with step 504 of FIG. 5, the mapping module 427 filters technical data assets that are determined to correspond to the business items 600A-600D by utilizing inferences derived from the knowledge graph 604 to obtain a subset of the technical data assets associated with the business items 600A-600D (e.g., listed as Items 1-3 in the mapping data 606). The mapping module 427 also determines relevant labels (e.g., Items 1-3 in the auto-labeling mapping data 608) for the data assets (e.g., Table 1, View 1, Column 1) in accordance with step 506 of FIG. 5, wherein the labels shown in the auto-labeling mapping data 608 meet a predetermined threshold value for automated labeling.

Advantageously, the above-identified labeling server 402 is configured to label data assets with irregular and complex naming rules intelligently; enable labeling of data assets with business terms automatically or automatically recommend candidate business terms, even when the terms are in a different language (i.e., no language barrier to automatic labeling); and provide label attribute support to accelerate the journey to self-service analytics and artificial intelligence (AI) model development.

Figure 7:
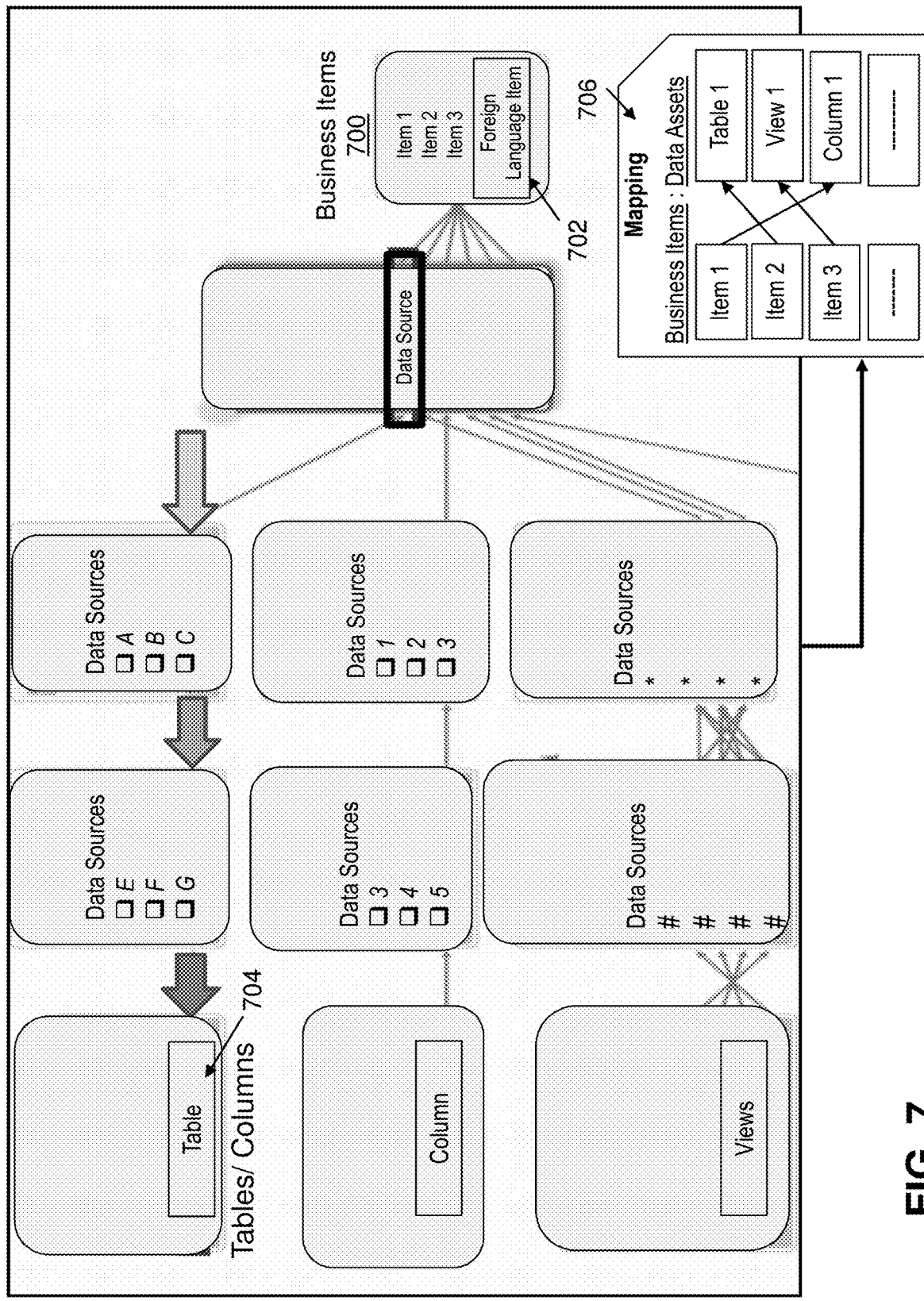
FIG. 7 depicts a flow diagram of an exemplary data lineage exploration scenario in accordance with aspects of the present invention.

FIG. 7 depicts a flow diagram of an exemplary data lineage exploration scenario in accordance with aspects of the present invention. Steps of the scenario of FIG. 7 may be carried out in the environment of FIG. 4 and are described with reference to elements depicted in FIG. 4 and the method steps depicted in FIG. 5.

A number of business items identified by the labeling server 402 in accordance with step 502 of FIG. 5 are represented at 700, wherein the business items include at least one item 702 in a foreign language. The labeling server 402 explores the data lineage of the business items 700, and traces the origins of data utilized to generate the business items 700 to an original technical data asset 704 (e.g., tables or columns of tables). The labeling server 402 then maps the technical data assets (e.g., 704) to the business items (e.g., 700), as represented by the mapping data 706. In aspects, the exploration of data lineage through API chain or other exploratory methods does not require any understanding of the meaning of the name of the business item. Accordingly, no translations of foreign business item names is required for the labeling server 402 to map technical data assets to the corresponding business items.

Figure 8:
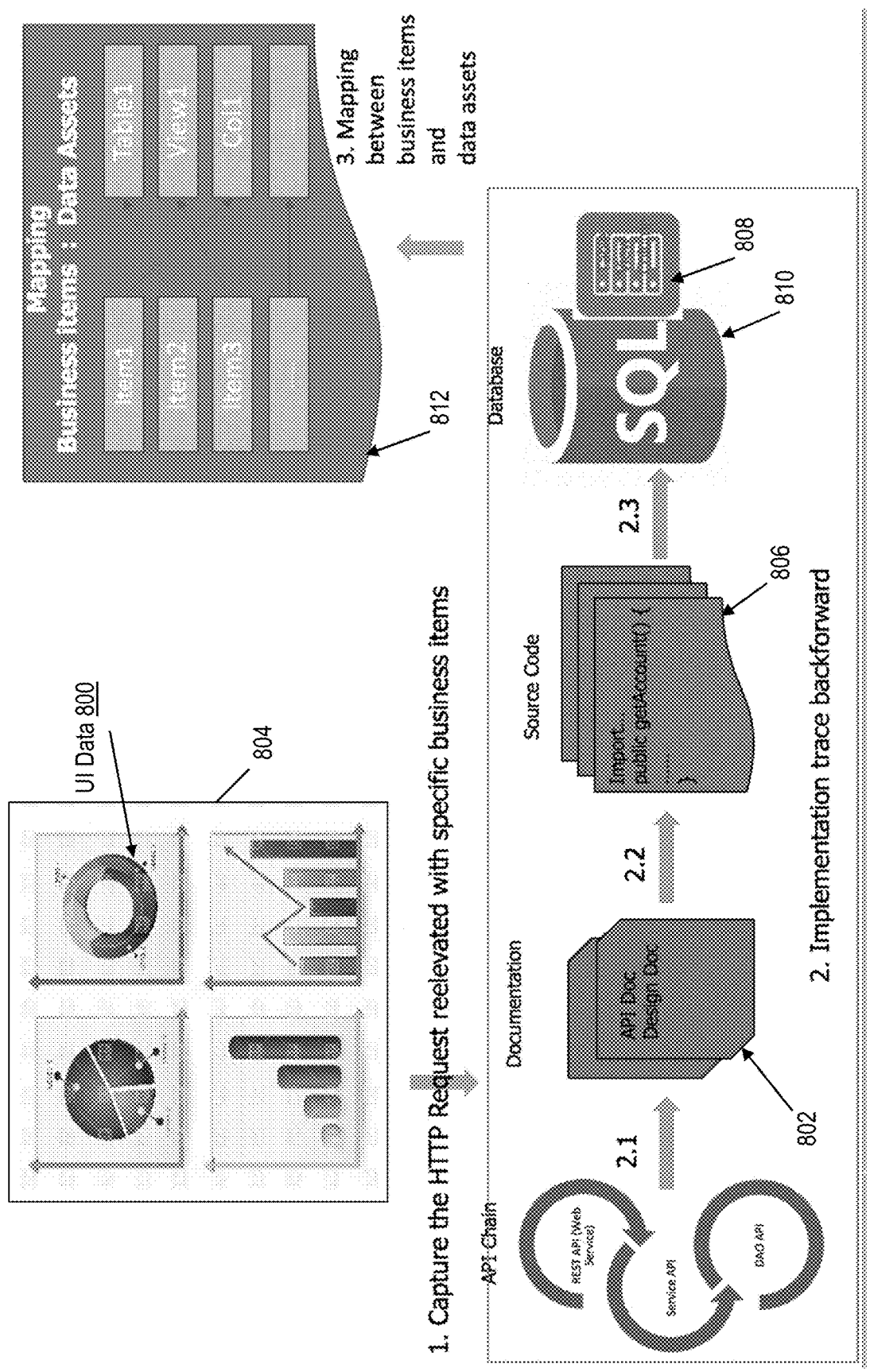
FIG. 8 depicts a flow diagram of an exemplary data lineage analysis method in accordance with aspects of the present invention.

FIG. 8 depicts a flow diagram of an exemplary data lineage analysis method in accordance with aspects of the present invention. Steps of the method may be carried out in the environment of FIG. 4 and are described with reference to elements depicted in FIG. 4 and the method steps depicted in FIG. 5.

In the example of FIG. 8, the labeling server 402 analyzes UI data 800 of a user to obtain UI data information, such as a hypertext transfer protocol (HTTP) requests utilized by a UI module (e.g., UI module 409) to build the UI data. The data analysis module 424 analyzes the API chain utilized to build the UI data, including exploring representational state transfer (REST) web API language, Service API information and data access object (DAO) API information. In the example of FIG. 8, the labeling server 402 of FIG. 4 generates an API document 802 including information regarding the API chain between lineage data and the business items (e.g., business item 804 in the UI data 800). The labeling server 402 further explores the source code of the API information at 806 to determine which technical data assets 808 in the SQL data 810 are associated with the business items (e.g., 804). In this example, the labeling server 402 generates mapping data 812 associating the business items with the associated technical data assets.

Figure 9:
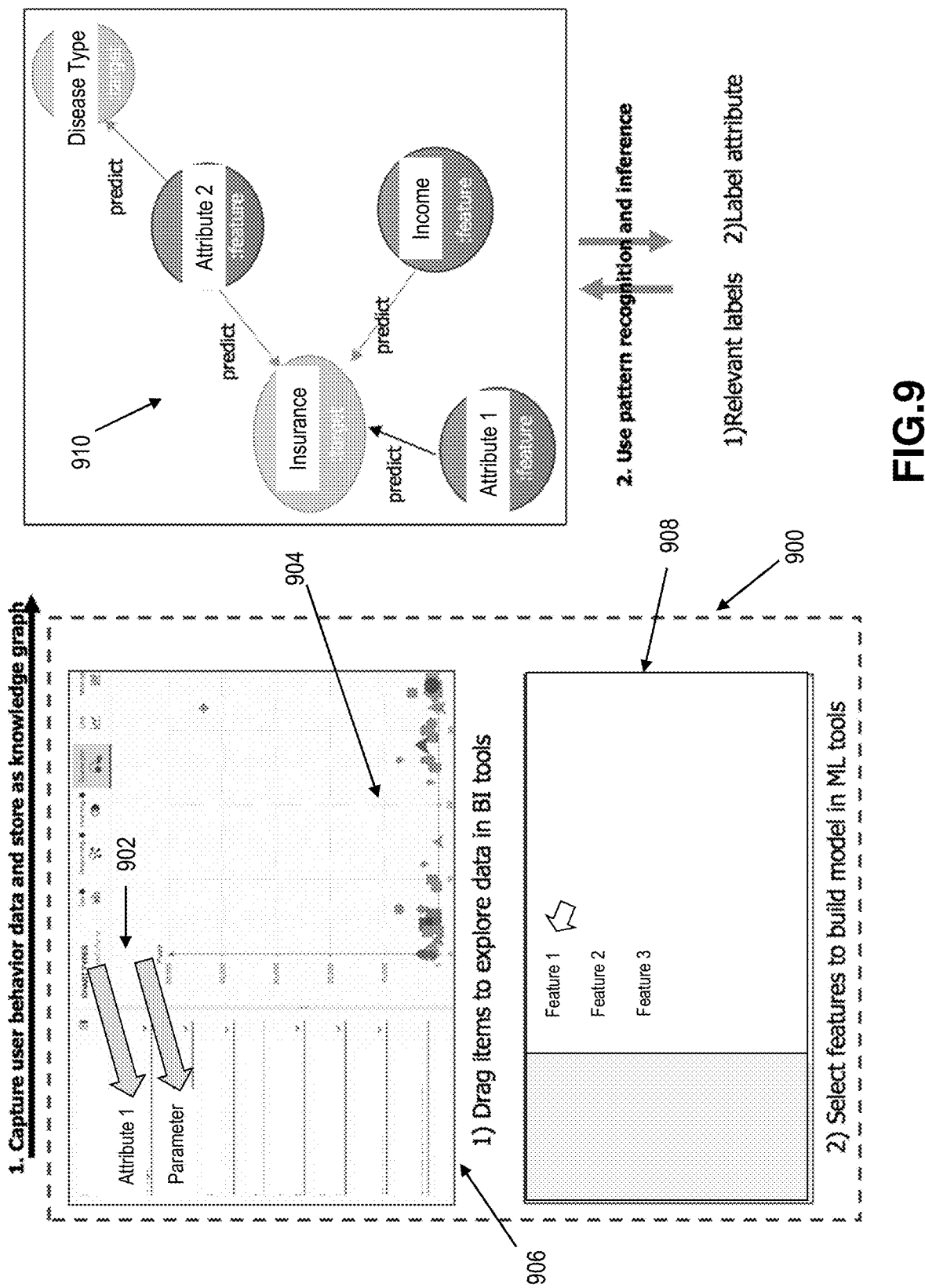
FIG. 9 is a diagram of an exemplary knowledge graph generating method in accordance with aspects of the present invention.

FIG. 9 is a diagram of an exemplary knowledge graph generating method in accordance with aspects of the present invention. Steps of the method may be carried out in the environment of FIG. 4 and are described with reference to elements depicted in FIG. 4 and the method steps depicted in FIG. 5.

A BI tool represented at 900 enables a user to set parameters 902 for building UI data represented at 904. In the example shown, the user selects an "Attribute 1" and a "Parameter" with a first selection tool 906, and selects features to build a model in a second tool 908. The knowledge graph module 425 of FIG. 4 generates the knowledge graph 910 based on the user selection data. In this example, the knowledge graph 910 includes 5 nodes constituting featured attributes, including the featured attributes labeled "Attribute 1", "Attribute 2" and "Income". In this example, the labeling server 402 filters out technical data attributes which are unnecessary to the business items of interest to the user, by focusing on only those technical data attributes associated with the featured attributes. For example, instead of focusing on a technical data attribute in the form of a table, the labeling server 402 focuses on only a column of the table (i.e., a subset of the table). Pattern recognition and inference tools are utilized by the labeling server 402 to associate a subset of the technical data with the business items in the UI data of the user, and thereafter the labeling server 402 determines relevant labels for the subset of the technical data based on featured attribute labels.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   aggregating, by a computing device, lineage data of a user, wherein the lineage data is source data for a dashboard User Interface (UI) report of the user;
   identifying, by the computing device, technical data assets in the lineage data and corresponding business items in the dashboard UI report generated based on the technical data assets;
   mapping, by the computing device, the technical data assets to the corresponding business items;
   determining, by the computing device, relevant labels to assign to the technical data assets from a label repository based on a similarity analysis of names of the corresponding business items to labels in the label repository;
   determining, by the computing device, that one of the relevant labels meets a confidence threshold based on the similarity analysis; and
   automatically assigning, by the computing device, the one of the relevant labels to an associated technical data asset based on the determining that the one of the relevant labels meets the confidence threshold; and
   generating, by the computing device, a notification to the user including another of the relevant labels based on determining that the other of the relevant labels does not meet the confidence threshold.

2. The computer-implemented method of claim 1, further comprising obtaining, by the computing device, the lineage data from remote lineage data sources based on information in a participant database.

3. The computer-implemented method of claim 1, further comprising generating, by the computing device, a knowledge graph based on user behavior data of the user.

4. The computer-implemented method of claim 3, further comprising determining, by the computing device, a subset of the technical data assets corresponding to the business items based on the knowledge graph, wherein the determining the relevant labels to assign to the technical data assets comprises determining the relevant labels to assign to the subset of the technical data assets.

5. The computer-implemented method of claim 1, wherein a service provider performs at least one selected from the group consisting of: creates the computing device, maintains the computing device, deploys the computing device, and supports the computing device.

6. The computer-implemented method of claim 1, wherein the automatically assigning the one of the relevant labels to an associated technical data asset is provided by a service provider on a subscription, advertising, and/or fee basis.

7. The computer-implemented method of claim 1, wherein the computer device includes software provided as a service in a cloud environment.

8. A computer program product comprising one or more computer readable storage media having program instructions collectively stored on the one or more computer readable storage media, the program instructions executable to:
   aggregate lineage data of a user, wherein the lineage data is source data for a dashboard User Interface (UI) report of the user;
   identify technical data assets in the lineage data and corresponding business items in the dashboard UI report generated based on the technical data assets;
   map the technical data assets to the corresponding business items;
   determine relevant labels to assign to the technical data assets from a label repository based on a similarity analysis of names of the corresponding business items to labels in the label repository;
   determine whether each of the relevant labels meets a confidence threshold based on the similarity analysis;
   automatically assign one or more of the relevant labels to associated ones of the technical data assets based on determining that the one or more of the relevant labels meet the confidence threshold; and
   generate a notification to the user including the one or more of the relevant labels based on determining that the one or more of the relevant labels do not meet the confidence threshold.

9. The computer program product of claim 8, wherein the program instructions further cause the computing device to obtain the participant data from the user.

10. The computer program product of claim 8, wherein the program instructions further cause the computing device to generate a knowledge graph based on user behavior data of the user.

11. The computer program product of claim 10, wherein the program instructions further cause the computing device to determine a subset of the technical data assets corresponding to the business items based on the knowledge graph, wherein the determining the relevant labels to assign to the technical data assets comprises determining the relevant labels to assign to the subset of the technical data assets and the automatically assigning the one or more of the relevant labels to associated ones of the technical data assets comprises automatically assigning the one or more of the relevant labels to associated ones of the subset of the technical data assets.

12. A system comprising:
   a processor, a computer readable memory, one or more computer readable storage media, and program instructions collectively stored on the one or more computer readable storage media for execution by the processor via the computer readable memory, wherein the program instructions are executable to:

aggregate lineage data of a user, wherein the lineage data is source data for a dashboard User Interface (UI) report of the user;

identify technical data assets in the lineage data and corresponding business items in the dashboard UI report generated based on the technical data assets;

map the technical data assets to the corresponding business items;

determine relevant labels to assign to the technical data assets from a label repository based on a similarity analysis of names of the corresponding business items to labels in the label repository;

determine whether each of the relevant labels meets a confidence threshold based on the similarity analysis;

automatically assign one or more of the relevant labels to associated ones of the technical data assets based on determining that the one or more of the relevant labels meet the confidence threshold; and generate a notification to the user including the one or more of the relevant labels based on determining that the one or more of the relevant labels do not meet the confidence threshold.

13. The system of claim 12, wherein the program instructions are further executable to obtain participant data from the user, wherein the participant data identifies the lineage data to be aggregated by the computing device.

14. The system of claim 12, wherein the program instructions are further executable to generate a knowledge graph based on user behavior data of the user, wherein the user behavior data is from a UI report generating tool utilized to generate the dashboard UI report.

15. The system of claim 14, wherein the program instructions are further executable to determine a subset of the technical data assets corresponding to the business items based on the knowledge graph, wherein the determining the relevant labels to assign to the technical data assets comprises determining the relevant labels to assign to the subset of the technical data assets and the automatically assigning the one or more of the relevant labels to associated ones of the technical data assets comprises automatically assigning the one or more of the relevant labels to associated ones of the subset of the technical data assets.

16. The system of claim 12, wherein the notification includes recommendations to the user to label the technical data assets with the one or more of the relevant labels.

17. The system of claim 12, wherein the technical data assets are selected from the group consisting of: data tables; data views, and data columns.

18. The system of claim 12, wherein the business items are selected from the group consisting of: graphs; charts; and information tables.

19. The method of claim 1, wherein:
the technical data assets are selected from the group consisting of: data tables; data views, and data columns; and
the business items are selected form the group consisting of: graphs; charts; and information tables.

20. The computer program product of claim 8, wherein:
the technical data assets are selected from the group consisting of: data tables; data views, and data columns; and
the business items are selected form the group consisting of: graphs; charts; and information tables.

\* \* \* \* \*